US007282712B2

(12) United States Patent
Shibayama

(10) Patent No.: US 7,282,712 B2
(45) Date of Patent: Oct. 16, 2007

(54) INFRARED SENSOR

(75) Inventor: Katsumi Shibayama, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 286 days.

(21) Appl. No.: 10/442,109

(22) Filed: May 21, 2003

(65) Prior Publication Data

US 2003/0205670 A1 Nov. 6, 2003

Related U.S. Application Data

(63) Continuation-in-part of application No. PCT/JP01/03077, filed on Apr. 10, 2001.

(51) Int. Cl.
*G01J 5/00* (2006.01)

(52) U.S. Cl. ................................ 250/338.4; 250/338.1

(58) Field of Classification Search ............ 250/338.4; 136/225

See application file for complete search history.

(56) References Cited

U.S. PATENT DOCUMENTS 5,059,543 A 10/1991 Wise et al. .................... 437/3
5,100,479 A * 3/1992 Wise et al. ................. 136/225
6,043,493 A 3/2000 Kim et al.
6,203,194 B1 * 3/2001 Beerwerth et al. .......... 374/133
6,300,554 B1 * 10/2001 Du et al. .................... 136/201
6,305,840 B1 * 10/2001 Kim et al. .................. 374/133
6,348,650 B1 * 2/2002 Endo et al. ................. 136/201
6,655,834 B1 * 12/2003 Frey et al. .................. 374/179
6,863,438 B2 * 3/2005 Pannek et al. .............. 374/121

FOREIGN PATENT DOCUMENTS

CN 406446 9/1989
EP 1 045 232 A2 10/2000
EP 1083609 A1 * 3/2001
JP 02-208525 8/1990
JP 03-077031 4/1991
JP H03-122532 5/1991
JP H11-258055 9/1999
JP 2001-091364 4/2001

* cited by examiner

*Primary Examiner*—Albert Gagliardi
(74) *Attorney, Agent, or Firm*—Drinker Biddle & Reath LLP

(57) ABSTRACT

An infrared sensor of this invention is characterized by including a support member including a support film and a substrate that supports the support film, a polysilicon film which ranges from above a concavity to above the substrate, $SiO_2$ which is formed on the polysilicon film and has a first junction hole above the concavity and a second junction hole above the substrate, an aluminum film which is connected to the polysilicon film through the first junction hole and connected to an adjacent polysilicon film through the second junction hole, and a heat absorption layer formed above the concavity to cover a portion above the first junction hole, wherein the aluminum film is stacked on the corresponding polysilicon film via the $SiO_2$ above the concavity.

8 Claims, 8 Drawing Sheets

INFRARED SENSOR

RELATED APPLICATION

This is a continuation-in-part application of application Ser. No. PCT/JP01/03077 filed on Apr. 10, 2001.

BACKGROUND OF THE INVENTION

1. Field of the Invention

The present invention relates to an infrared sensor and, more particularly, to a thermopile infrared sensor.

2. Related Background Art

Conventional thermopile infrared sensors are shown in FIGS. 7 and 8. FIG. 7 shows the thermopile patterns of an infrared sensor. In this example, polysilicon 4 and aluminum 6, which are adjacent to each other, form a thermocouple. An infrared sensor shown in FIG. 8 is disclosed in Japanese Patent No. 2663612. In this example, a thermocouple made of a p-type semiconductor 106 and an n-type semiconductor 111 is formed on a cantilever 103. These infrared sensors measure the intensity of infrared rays incident on them on the basis of an electromotive force generated by the temperature difference between a hot junction and a cold junction of a thermocouple due to the Seebeck effect. Highly sensitive infrared sensors are implemented by a plurality of thermocouples in series.

In the infrared sensor shown in FIG. 7, however, since the polysilicon 4 and aluminum 6 are formed adjacent to each other, the thermocouple becomes large, and a plurality of thermocouples cannot be laid out at a high density. In the infrared sensor shown in FIG. 8, since the thermocouples are formed on the cantilever 103, the mechanical strength of the cantilever 103 decreases. In addition, since a infrared absorbing film 105 and the thermocouples are formed apart from each other, heat generated in the infrared absorbing film 105 is not efficiently transmitted to the thermocouples.

Japanese Patent No. 2663612 describes, as a prior art, an infrared sensor having a thermocouple made of an aluminum and a p-type diffusion layer resistor and points out that when aluminum is used, the sensitivity degrades because the Seebeck effect is small, and the thermal resistivity decreases. This patent also points out that the sensitivity degrades because the cantilever warps due to the bimetal effect.

SUMMARY OF THE INVENTION

The present inventors found that a thermopile made of a polysilicon film and an aluminum film is practical and sufficiently excellent.

It is an object of the present invention to provide an infrared sensor which can lay out at a high density thermocouples using thermopiles each made of a polysilicon film and an aluminum film and efficiently transmit heat generated in a infrared absorbing film, and has a high mechanical strength.

In order to solve the above problem, an infrared sensor of the present invention is characterized by comprising a support member including a support film made of an insulating material and a substrate that has a concavity and supports the support film, a polysilicon layer which has a predetermined conductivity type and ranges from above the concavity to above the substrate, an insulating film which is formed on the polysilicon layer and has a first junction hole formed above the concavity and a second junction hole formed above the substrate, an aluminum layer which is connected to the polysilicon layer through the first junction hole and connected to an adjacent polysilicon layer through the second junction hole, and an infrared absorption layer formed above the concavity to cover a portion above the first junction hole, wherein the aluminum layer connected to the corresponding polysilicon layer through the first junction hole is stacked via the insulating film as an overlying layer of the corresponding polysilicon layer above the concavity.

Since a thermocouple is formed by stacking a polysilicon layer and an aluminum layer, the thermocouple is small, and a plurality of thermocouples can be places in series can be increased. Since the multilayered structure of the polysilicon layer and aluminum layer ranges from above a concavity to above a substrate, the mechanical strength of the thin concavity can be increased. Since the infrared absorption layer is formed to cover first junctions formed in the thermocouples, heat generated in the infrared absorption layer can be efficiently transmitted to the thermocouples.

The infrared sensor of the present invention may be characterized in that the substrate is made of silicon, and the concavity is formed by etching. Since the concavity is formed by etching, the shape of the concavity can be accurately implemented.

The infrared sensor of the present invention may be characterized in that the aluminum layer is formed to be narrower than the polysilicon layer at least above the concavity. Since the aluminum layer having a high thermal conductivity is formed to be narrow, heat transfer can be samll. In addition, reflection of infrared rays by the aluminum layer above the concavity, where the infrared absorption layer is formed, can be reduced.

The infrared sensor of the present invention may be characterized in that a plurality of multilayered structures each of which has the aluminum layer stacked on the polysilicon layer via the insulating film are formed, and the plurality of first junctions are covered with the infrared absorption layer integrally formed. Since the plurality of multilayered structures function as a support structure integral with the infrared absorption layer, the mechanical strength of the thin concavity can be further increased.

DESCRIPTION OF THE PREFERRED EMBODIMENTS

Figure 1A:
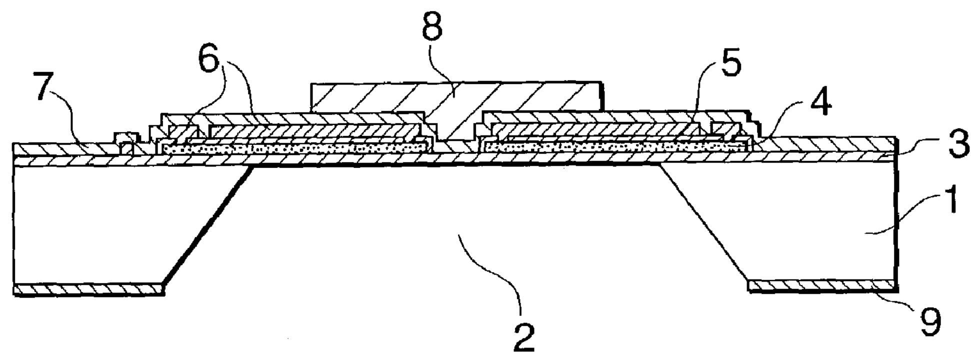
FIGS. 1A and 1B are views showing a section and thermopile patterns of an infrared sensor according to the first embodiment, respectively.

The embodiments of the present invention will be described below with reference to the accompanying drawings. The same reference numerals denote the same elements, and a repetitive description thereof will be omitted.

Figure 1B:
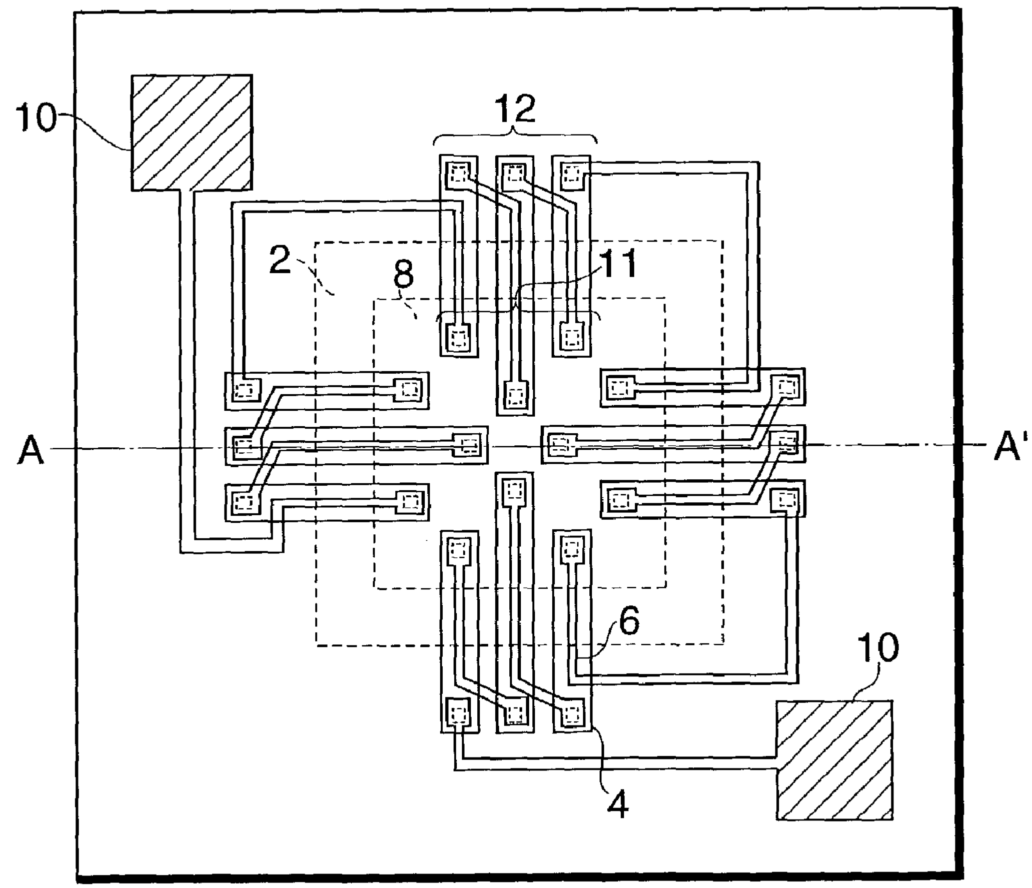

A section and thermopile patterns of an infrared sensor according to the first embodiment are shown in FIGS. 1A and 1B. FIG. 1A is a sectional view taken along A-A' in FIG. 1B. As shown in FIG. 1A, the support member of a diaphragm structure has a silicon substrate 1 having a concavity 2, and a support film 3 which is supported by the silicon substrate 1. A polysilicon film 4 in which an n- or p-type impurity is doped at $10^{18}$ to $10^{20}$ $cm^{-3}$ and an aluminum film 6 via an $SiO_2$ film 5 serving as an insulating film are stacked on the support film 3. The polysilicon film 4 and aluminum film 6 are connected by an opening portion of the $SiO_2$ film 5 to form a junction. The exposed surfaces of the support film 3 and thermocouples are coated with a passivation film 7 made of SiN. A infrared absorbing film 8 is formed on the passivation film 7 above the concavity 2.

Note that the passivation film 7 may be an insulating film such as an $SiO_2$ or polyimide film. A blackened resin is used in the infrared absorbing film 8. As this blackened resin, a resin (epoxy, silicone, acrylic, urethane, or polyimide resin) mixed with a black filler such as carbon filler or a black resist may be used.

As shown in FIG. 1B, the long multi-layered structures each made of the polysilicon film 4 and aluminum film 6 range from above the silicon substrate 1 to above the concavity 2 so as to extend from four directions perpendicular to the four sides of the rectangular (square or oblong) concavity 2 toward the center of the concavity 2.

The polysilicon film 4 and aluminum film 6 are stacked above the concavity 2. The width of the aluminum film 6 is smaller than that of the polysilicon film 4. Each polysilicon film 4 and aluminum film 6 which are stacked are connected at an opening portion of the $SiO_2$ film 5 in a region where the infrared absorbing film 8 is formed, thereby forming a hot junction 11. In addition, each polysilicon film 4 and aluminum film 6 which are adjacent to each other are connected at an opening portion of the $SiO_2$ film 5 above the silicon substrate 1, thereby forming a cold junction 12. These thermocouples are connected in series. An electromotive force generated by the Seebeck effect is extracted by extraction electrodes 10. In the regions where the extraction electrodes 10 are formed, the passivation film 7 is open.

A method of forming the concavity will be described. After a support film 3, thermopile patterns, passivation film 7, and infrared absorbing film 8 are formed on a surface of the silicon substrate 1, where no concavity is formed, a mask 9 made of SiN or the like that is resistant against a silicon etchant is formed on a surface (lower surface) of a silicon substrate 1 on the opposite side to the surface with the support film 3. The mask 9 in a region where the concavity 2 should be formed is opened, and etching is performed while protecting the surface of the silicon substrate 1. Etching starts from the opening portion of the mask 9 on the lower surface. Etching stops at the support film 3 which is resistant against the etchant. As the etchant, for example, potassium hydroxide solution is used. When a (100) plane is used as the silicon substrate 1, anisotropic etching can be performed. Thus, a diaphragm structure having the concavity 2 shown in FIG. 1(*a*) can be formed. Note that the support film 3 may be a single SiN layer, a single $SiO_2$ layer, or a multi-layered film containing any one of SiN, $SiO_2$, PSG, and BPSG, and its thickness is 0.5 to 5 μm.

Figure 7:
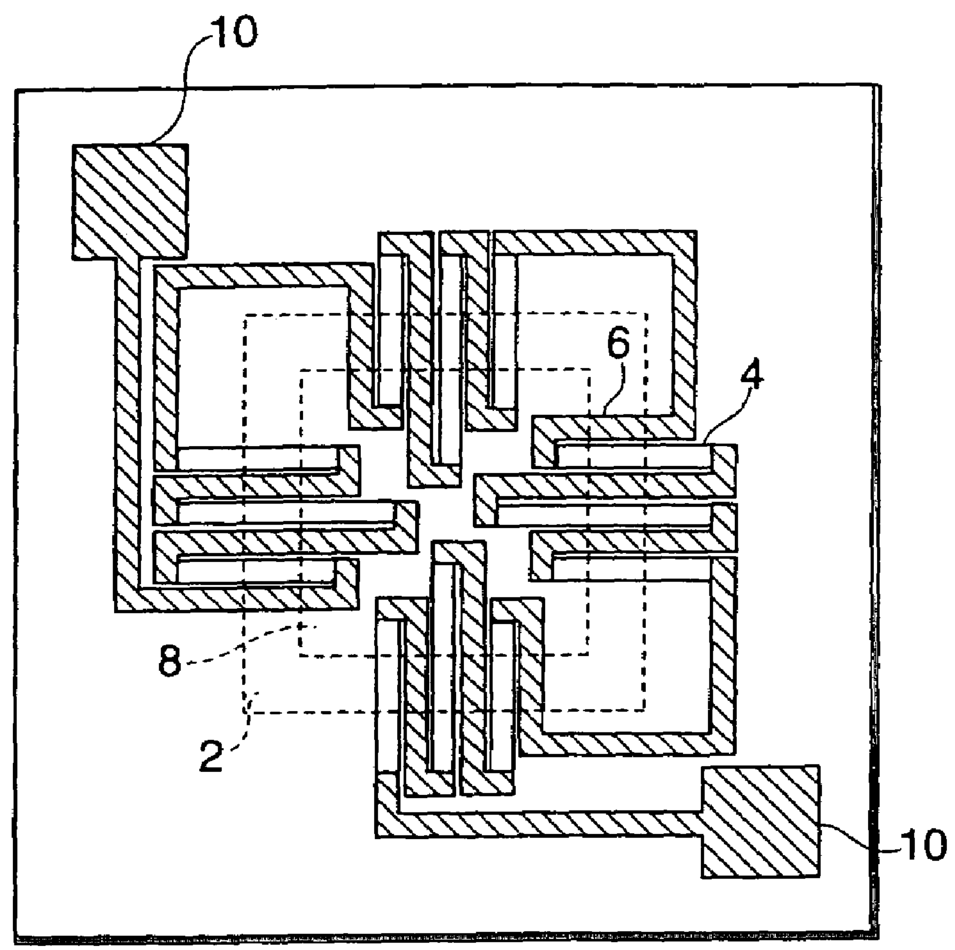
FIG. 7 is a view showing the thermopile patterns of a conventional infrared sensor.
Figure 8A:
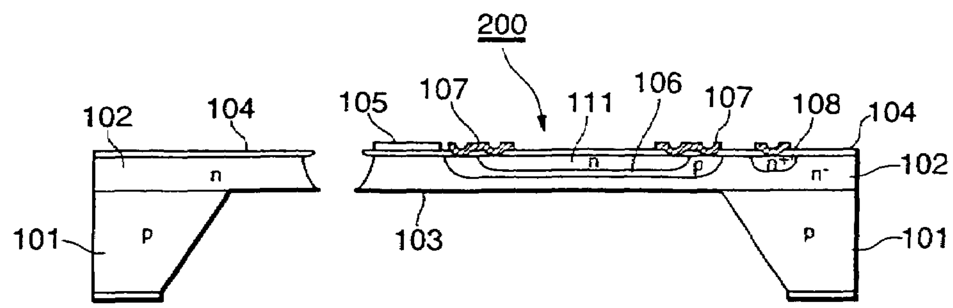
FIGS. 8A and 8B are views showing a section and thermopile patterns of a conventional infrared sensor, respectively.
Figure 8B:
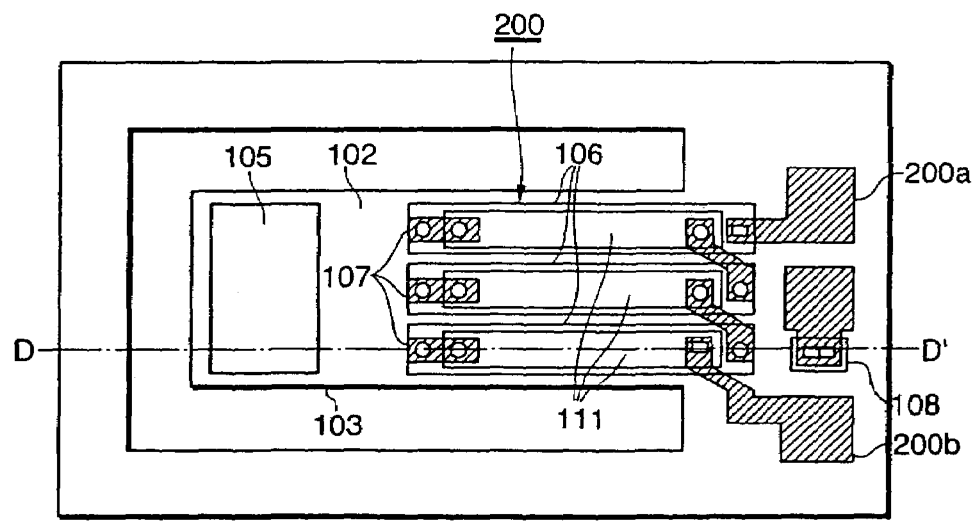

As described above, according to the infrared sensor of the first embodiment, since the polysilicon film 4 and aluminum film 6 are stacked, the one thermocouple becomes narrower than in the prior art shown in FIG. 7 in which the polysilicon film 4 and aluminum film 6 are laid out in parallel. Hence, thermocouples can be laid out at a high density. In addition, the thermopile pattern in which the polysilicon film 4 and aluminum film 6 are stacked via the $SiO_2$ film 5 has a higher mechanical support strength because of its three-layered structure. Since this structure is formed into a mesa shape ranging from above the concavity 2 to above the silicon substrate 1, the mechanical strength of the concavity 2 can be increased. In addition, since the single layer of infrared absorbing film 8 made of a material having an adhesive force adheres the support film 3 and all the thermopile patterns above the concavity 2, the mechanical strength in a region with a small thickness at the concavity 2 can be further increased. Furthermore, since the infrared absorbing film 8 is formed to cover all the hot junctions 11 of the thermopile patterns, heat generated in the infrared absorbing film 8 can be efficiently transmitted to the hot junctions 11.

In addition, the aluminum film 6 may fail to transmit heat obtained at a hot junction to the silicon substrate 1 because of a high thermal conductivity and degrade the sensitivity of the infrared sensor. However, since the thin and narrow aluminum film 6 is stacked on the polysilicon film 4 via the $SiO_2$ film 5 and therefore thermally insulated from the silicon substrate 1, the sensitivity of the infrared sensor does not degrade. The $SiO_2$ film 5 not only electrically insulates the polysilicon film 4 from the aluminum film 6 but also has a thermal insulating function for preventing heat transmission from the polysilicon film 4 to the aluminum film 6. When infrared rays incident on the infrared absorbing film 8 are reflected by the aluminum film 6 formed under the infrared absorbing film 8, the sensitivity of the infrared sensor may degrade. However, since the aluminum film 6 is formed narrow, reflection can be minimized. Since the reflected infrared rays are further absorbed by the infrared absorbing film 8, the sensitivity of the infrared sensor does not degrade.

The first embodiment is not limited to this. The shape of the concavity 2 is not limited to a rectangular shape and may be a circular shape. The thermopile patterns can be formed in accordance with the shape.

Figure 2:
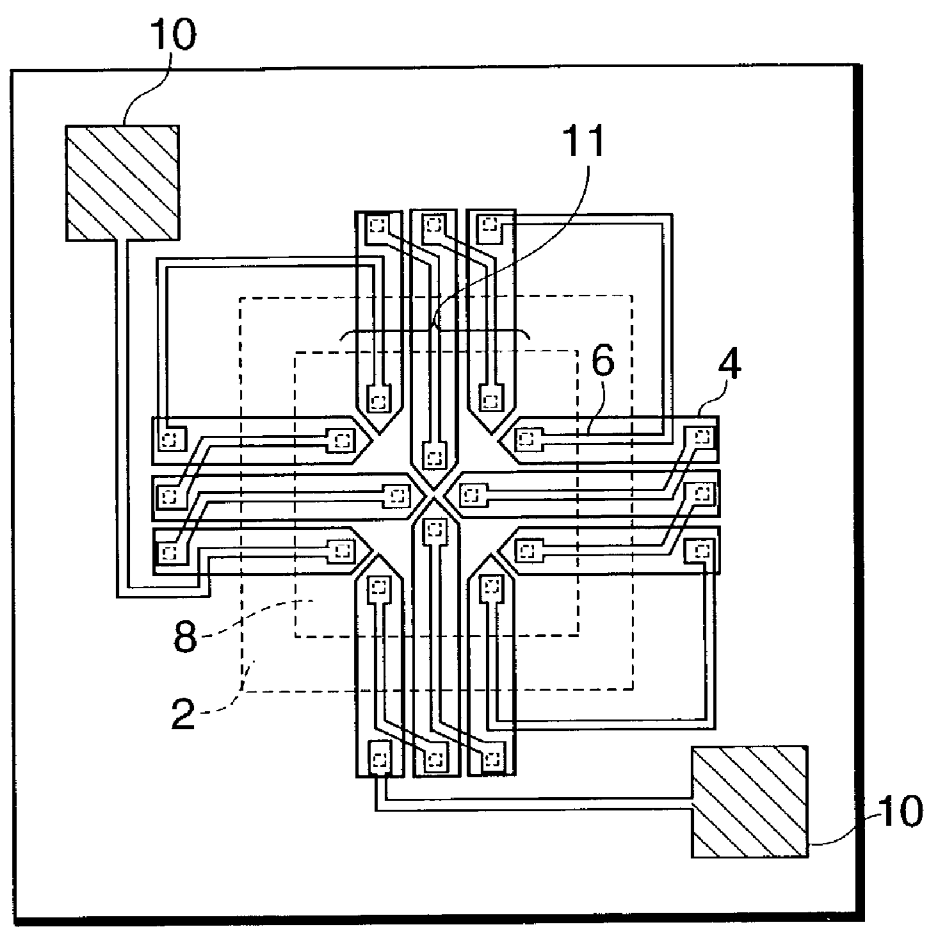
FIG. 2 is a view showing the thermopile patterns of an infrared sensor according to the second embodiment.

The thermopile patterns of an infrared sensor according to the second embodiment are shown in FIG. 2. The infrared sensor of the second embodiment is obtained by widening the polysilicon film 4 of the infrared sensor of the first embodiment shown in FIG. 1B and tapering the distal end of the polysilicon film 4 above the concavity 2.

When a semiconductor material such as polysilicon is used as a thermoelectronic material, the resistance of the thermopile increases because of the high resistivity, and accordingly, noise increases. According to the infrared sensor of the second embodiment, since a polysilicon film 4 and an aluminum film 6 are stacked, the width of the polysilicon film 4 can be increased in each of thermocouples in number equal to or more than the prior art shown in FIG. 7. Hence, the resistance of the thermocouple can be reduced, and the S/N ratio can be increased by suppressing thermal noise. Alternatively, a design is also possible in which the number of thermocouples is increased (not shown) as compared to the prior art shown in FIG. 7 while keeping the resistance value of each thermocouple unchanged. With this design, since the sensitivity increases, and noise remains unchanged, the S/N ratio can be increased. In addition, when the distal end of the polysilicon film 4 above a concavity 2 is tapered such that the distal end of the polysilicon film 4 can enter the center of the concavity 2, hot junctions 11 can concentrate on the center of the concavity 2. Accordingly, the temperature rise at the hot junctions becomes large, and the sensitivity increases. Furthermore, with this shape, since the area of the polysilicon film 4 above the concavity 2 increases, the mechanical strength in a region with a small thickness at the concavity 2 can be further increased.

Also, in the infrared sensor of the second embodiment, the width of the polysilicon film 4 of the infrared sensor of the first embodiment is increased, and the distal end of the polysilicon film 4 above the concavity 2 is tapered. Since the structures of the thermocouple and the like are the same as in the first embodiment, the infrared-sensor can obtain the same effect as that of the first embodiment. The shape according to the second embodiment, i.e., the tapered shape of the distal end of the polysilicon film 4 above the concavity 2 can be applied not only to this embodiment but also to other embodiments to obtain the same effect as in the second embodiment.

Figure 3A:
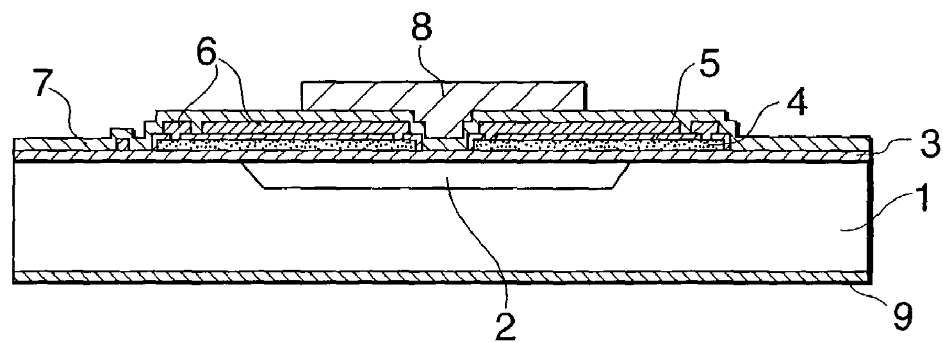
FIGS. 3A and 3B are views showing a section and thermopile patterns of an infrared sensor according to the third embodiment, respectively.
Figure 3B:
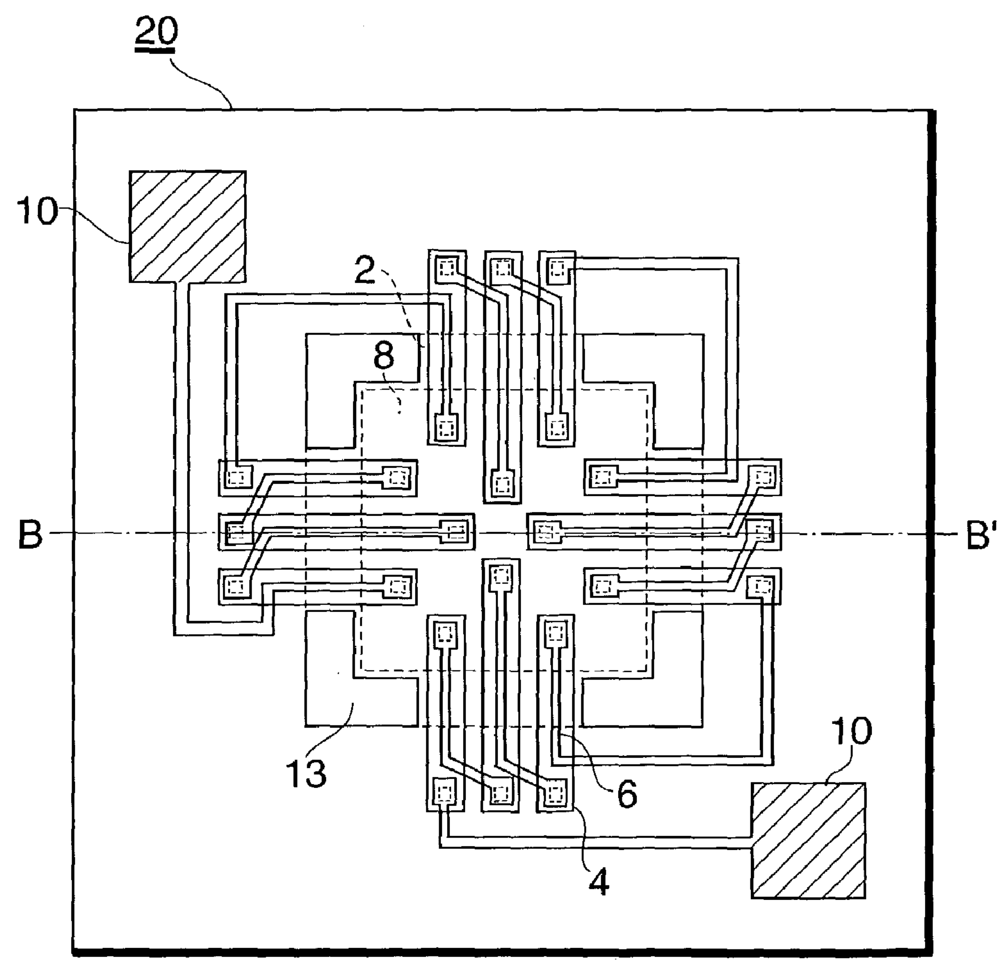

A section and thermopile patterns of an infrared sensor according to the third embodiment are shown in FIGS. 3A and 3B. The infrared sensor of the third embodiment is obtained by changing the shape of the concavity 2 of the infrared sensor according to the first embodiment shown in FIG. 1A. More specifically, as shown in FIG. 3A that shows a section taken along B-B' in FIG. 3B, in the third embodiment, the lower side of a concavity 2 is closed by a silicon substrate 1, etching holes 13 are formed at four portions of a passivation film 7 on an upper surface, and the concavity 2 is formed under the support film 3, unlike the first embodiment in which the lower side of the concavity 2 is open.

A method of forming the concavity 2 in the infrared sensor of the third embodiment will be described. First, a polysilicon sacrificial layer (not shown) having the same size as that of the concavity 2 is formed on the support film 3 side of a silicon substrate 1. After a support film 3, thermopile patterns, and passivation film 7 are formed, the support film 3 and passivation film 7 are opened to form the etching holes 13, as shown in FIG. 3B. A mask 9 is formed on the lower surface of the silicon substrate 1, though the mask 9 is not opened, unlike the first embodiment. Using, as an etchant, a hot solution mixture containing ethylenediamine, pyrocatechol, and water, etching is performed by using a (100) plane as the silicon substrate 1. At this time, the etchant sinks from the etching holes 13 into the polysilicon sacrificial layer to entirely etch the polysilicon sacrificial layer. After that, anisotropic etching of the silicon substrate 1 is started. With this process, a diaphragm structure having the concavity 2 shown in FIG. 3A can be formed. Note that etching is performed to a depth of 2 to 10 μm.

In the infrared sensor of the third embodiment, only the shape of the concavity 2 is different from that of the first embodiment while the thermopile pattern is the same as in the first embodiment. Hence, the infrared sensor can obtain the same effect as that of the first embodiment. In addition, in the infrared sensor of the third embodiment, since the lower side is closed by the silicon substrate 1, die bonding to a support member such as a lead frame is easy, and the mechanical strength increases. Note that the third embodiment is not limited to this. The shape of the concavity 2 is not limited to a rectangular shape and may be a circular shape. The thermopile patterns can be formed in accordance with the shape. The shape and positions of the etching holes 13 are not limited to those shown in FIG. 3 and can be changed in accordance with the thermopile patterns. To form the diaphragm structure, only the polysilicon sacrificial layer may be etched. In this case, the thickness of the polysilicon sacrificial layer is 0.3 to 1.5 μm.

Figure 4A:
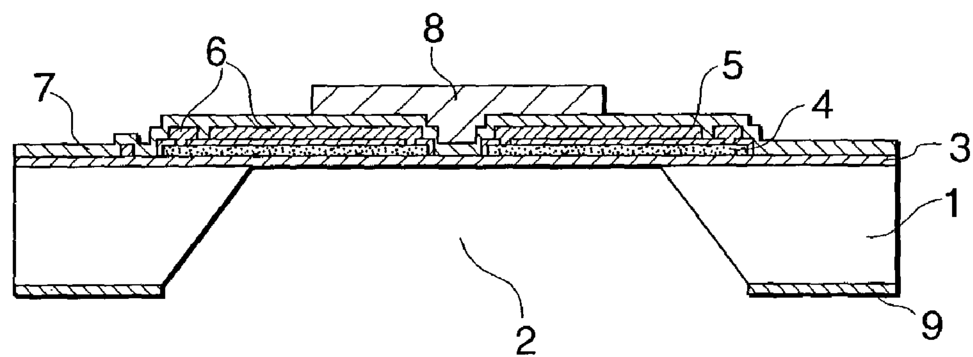
FIGS. 4A and 4B are views showing a section and thermopile patterns of an infrared sensor according to the fourth embodiment.
Figure 4B:
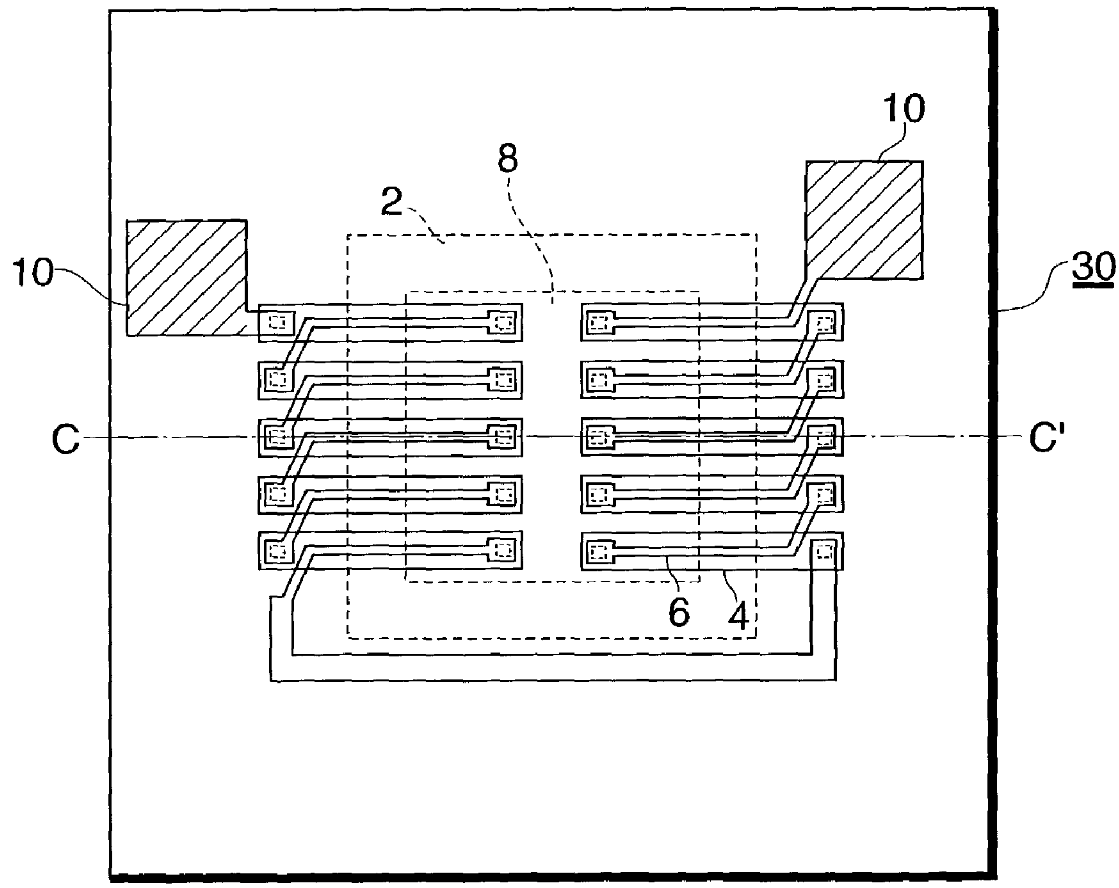

A section and thermopile patterns of an infrared sensor according to the fourth embodiment are shown in FIGS. 4A and 4B. The infrared sensor of the fourth embodiment is obtained by changing the thermopile patterns of the infrared sensor according to the first embodiment shown in FIG. 1B. In FIG. 1B, thermocouples are formed perpendicular to the four sides of the oblong concavity 2. In the infrared sensor of the fourth embodiment, as shown in FIG. 4B, thermocouples are formed to extend from two directions perpendicular to only two opposing sides of a rectangular concavity 2 toward the center of the concavity 2. The distance between the opposing thermopile patterns extending from the two directions to the center of the concavity 2 is 2 to 40 μm. When this distance is made as short as possible, the temperature rise at hot junctions becomes large, and the sensitivity can be increased.

In the infrared sensor of the fourth embodiment, only the thermopile patterns of the infrared sensor are different from those of the first embodiment while the structures of the thermocouple and the like are the same as in the first embodiment. Hence, the infrared sensor can obtain the same effect as that of the first embodiment. In addition, although the infrared sensors of the first to third embodiments are especially suitable for a case wherein the irradiation spot of infrared rays has a concentric circular shape, the infrared sensor of the fourth embodiment is suitable for a case wherein the irradiation spot of infrared rays has a linear or elongated shape. The fourth embodiment is not limited to this. The shape and forming method of the concavity 2 may be the same as in the third embodiment.

Figure 5:
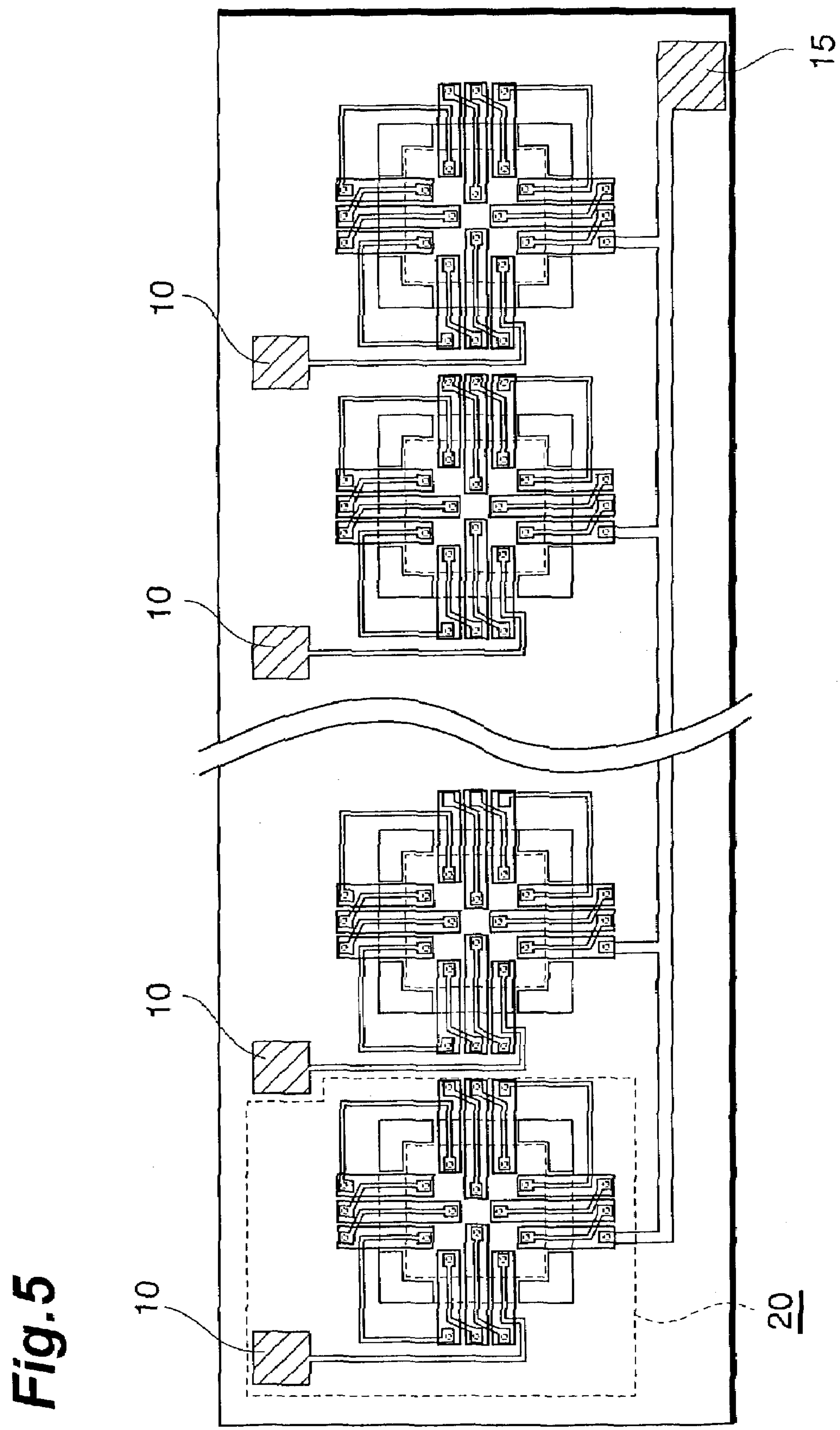
FIG. 5 is a view showing the thermopile patterns of an infrared sensor according to the fifth embodiment.

The thermopile patterns of an infrared sensor according to the fifth embodiment is shown in FIG. 5. In the infrared sensor of the fifth embodiment, the infrared sensor of the third embodiment shown in FIG. 3B is used as one unit 20, and the units 20 are arranged in a one-dimensional array on a single silicon substrate 1. In the infrared sensor of the fifth embodiment, one of extraction electrodes 10 shown in FIG. 3B is connected as a common electrode of the units, and a common extraction electrode 15 is arranged.

According to the infrared sensor of the fifth embodiment, the difference in infrared irradiation intensity between positions can be measured. In addition, since the infrared sensor of one unit has the same structure as in the third embodiment, the same effect as that of the third embodiment can be obtained.

Note that the fifth embodiment is not limited to this. In the fifth embodiment, one unit is arranged in a one-dimensional array. However, the units may be arranged in a two-dimensional array. With this arrangement, the difference in infrared irradiation intensity between two-dimensional positions can be measured.

Figure 6:
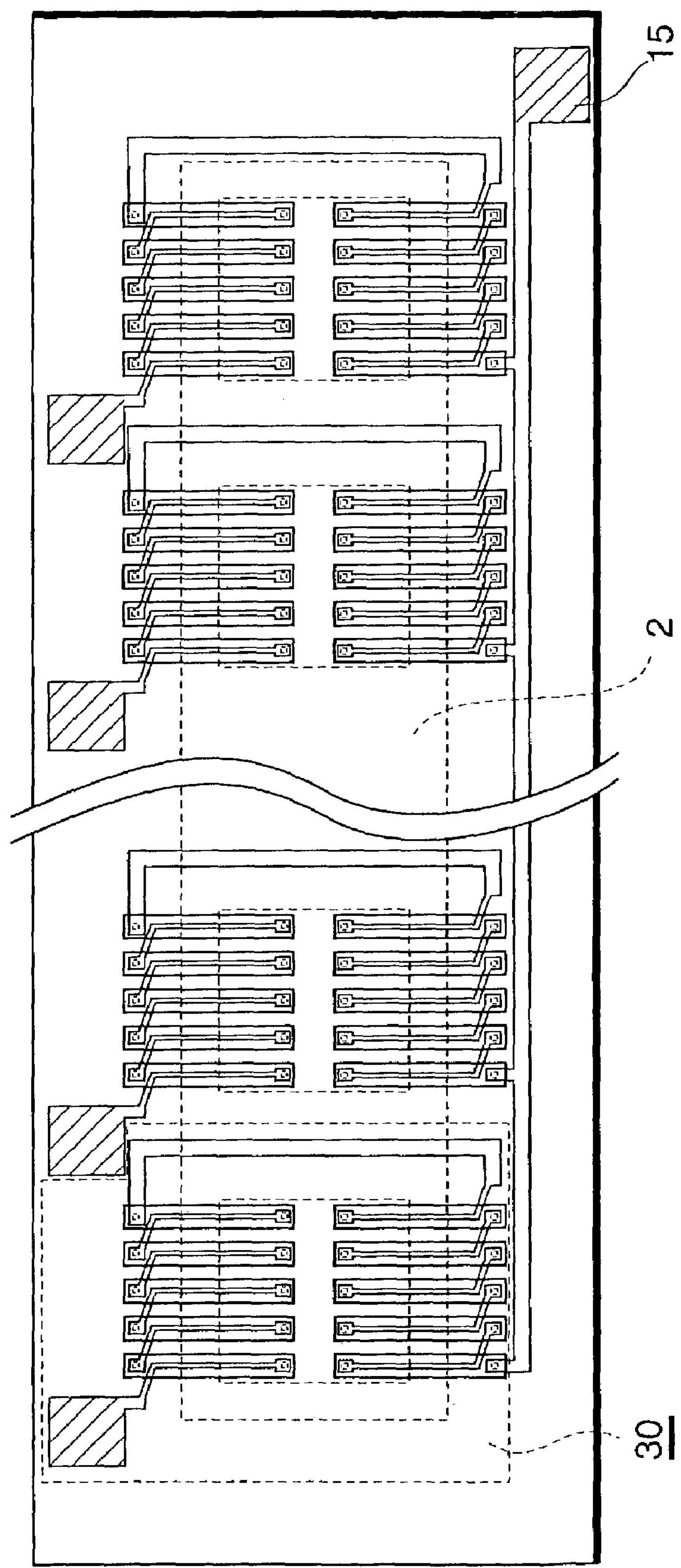
FIG. 6 is a view showing the thermopile patterns of an infrared sensor according to the sixth embodiment.

The thermopile patterns of an infrared sensor according to the sixth embodiment are shown in FIG. 6. In the infrared sensor of the sixth embodiment, the infrared sensor of the fourth embodiment shown in FIG. 4B is used as one unit 30, and the units 30 are arranged in a one-dimensional array on a single silicon substrate 1. In the infrared sensor of the sixth embodiment, one of extraction electrodes 10 shown in FIG. 4B is connected as a common electrode of the units, and a common extraction electrode 15 is arranged.

According to the infrared sensor of the sixth embodiment, the difference in infrared irradiation intensity between positions can be measured. In addition, since the infrared sensor of one unit has the same structure as in the fourth embodiment, the same effect as that of the fourth embodiment can be obtained.

Note that the sixth embodiment is not limited to this. In the sixth embodiment, one unit is arranged in a one-dimensional array. However, the units may be arranged in a two-dimensional array. With this arrangement, the difference in infrared irradiation intensity between two-dimensional positions can be measured.

As has been described above in detail, according to the infrared sensor of the present invention, since a thermocouple is formed by stacking a polysilicon layer and an aluminum layer, the thermocouple is small, and a plurality of thermocouples can be placed in series. Since the multilayered structure of the polysilicon layer and aluminum layer ranges from above a concavity to above a substrate, the mechanical strength of the thin concavity can be increased. Since a plurality of multilayered structures each including a polysilicon layer and an aluminum layer via an insulating film are formed, and the plurality of multilayered structures function as a support structure integral with an infrared absorption layer, the mechanical strength of the thin concavity can be further increased. Since the infrared absorption layer is formed to cover first junctions formed in the thermocouples, heat generated in the infrared absorption layer can be efficiently transmitted to the thermocouples.

With this arrangement, a sensitive infrared sensor with a high mechanical strength can be obtained.

What is claimed is:

1. An infrared sensor comprising:

a support member including a support film made of an insulating material and a substrate that has a concavity and supports the support film;

a plurality of polysilicon layers each of which has a predetermined conductivity type and extends from a location above the concavity to a location above the substrate, and each of which comprises an elongated portion having edges that extend parallel to one another in a longitudinal direction of the elongated portion, and a tapered portion located at a distal end of the elongated portion located above the concavity and being configured such that edges of the tapered portion gradually converge toward one another in a non-parallel fashion in a distal direction of the elongated portion;

an insulating film which is formed on the polysilicon layers and has a first junction hole formed above the concavity and a second junction hole formed above the substrate;

an aluminum wiring layer which is connected to a first one of the polysilicon layers through the first junction hole and which is connected to an adjacent one of the polysilicon layers through the second junction hole; and an infrared absorption layer formed above the concavity to cover a portion above the first junction hole, wherein the aluminum layer connected to the first polysilicon layer through the first junction hole is stacked via the insulating film as an overlying layer of the first polysilicon layer above the concavity, and wherein the tapered portion of the first polysilicon wiring layer is coupled to the elongated portion of the first polysilicon wiring layer, and a hot junction portion is formed within the elongated portion of the first polysilicon wiring layer at a location where the aluminum wiring layer is connected to the first polysilicon wiring layer through the first junction hole.

2. An infrared sensor according to claim 1, characterized in that the substrate is made of silicon, and the concavity is formed by etching.

3. An infrared sensor according to claim 2, characterized in that the aluminum layer is formed to be narrower than the first polysilicon layer at least above the concavity.

4. An infrared sensor according to claim 2, characterized in that a plurality of multilayered structures each of which has the aluminum layer stacked on the first polysilicon layer via the insulating film are formed, and the plurality of first junction holes are covered with the infrared absorption layer integrally formed.

5. An infrared sensor according to claim 1, characterized in that the aluminum layer is formed to be narrower than the first polysilicon layer at least above the concavity.

6. An infrared sensor according to claim 5, characterized in that a plurality of multilayered structures each of which has the aluminum layer stacked on the first polysilicon layer via the insulating film are formed, and the plurality of first junction holes are covered with said infrared absorption layer integrally formed.

7. An infrared sensor according to claim 1, characterized in that a plurality of multilayered structures each of which has the aluminum layer stacked on the first polysilicon layer via the insulating film are formed, and the plurality of first junction holes are covered with the infrared absorption layer integrally formed.

8. An infrared sensor according to claim 1, wherein said infrared absorption layer is made of blackened resin material.

* * * * *